United States Patent
Chadwick et al.

(10) Patent No.: US 9,250,645 B2
(45) Date of Patent: Feb. 2, 2016

(54) CIRCUIT DESIGN FOR BALANCED LOGIC STRESS

(71) Applicant: International Business Machines Corporation, Armonk, NY (US)

(72) Inventors: Nathaniel R. Chadwick, Lowell, MA (US); Frances S. M. Clougherty, South Burlington, VT (US); William P. Hovis, Rochester, MN (US); Kirk D. Peterson, Jericho, VT (US); Mack W. Riley, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 14/198,790

(22) Filed: Mar. 6, 2014

(65) Prior Publication Data

US 2015/0253807 A1    Sep. 10, 2015

(51) Int. Cl.
*G06F 1/08*     (2006.01)
*G06F 13/20*    (2006.01)

(52) U.S. Cl.
CPC . *G06F 1/08* (2013.01); *G06F 13/20* (2013.01)

(58) Field of Classification Search
CPC .............. G06F 1/04; G06F 1/08; G06F 1/32; G06F 1/3234; G06F 13/20; G06F 7/76; G06F 7/762
See application file for complete search history.

(56) References Cited

U.S. PATENT DOCUMENTS

| | | | |
|---|---|---|---|
| 6,651,230 B2 | 11/2003 | Cohn et al. | |
| 6,879,177 B1 | 4/2005 | Bolam et al. | |
| 7,205,854 B2 | 4/2007 | Liu | |
| 2005/0134360 A1* | 6/2005 | Aipperspach | G11C 7/1045 327/513 |
| 2011/0051530 A1* | 3/2011 | Kushida | G11C 11/413 365/189.05 |
| 2013/0033308 A1 | 2/2013 | Shimogawa et al. | |
| 2013/0163713 A1 | 6/2013 | Booth et al. | |
| 2013/0223172 A1 | 8/2013 | Hsu et al. | |
| 2014/0177323 A1* | 6/2014 | Hegde | G11C 11/419 365/154 |

OTHER PUBLICATIONS

Anonymous, "FET array for simultaneous stressing and addressable measurements of temporal variations and noise," An IP.com Prior Art Database Technical Disclosure, Jan. 16, 2012, 3 pages. IP.com No. IPCOM000214194D.

Anonymous, "Circuit and Methodology for Stressing Transistors for NBTI and TDDB and Differentiating the Circuit Effects of NBTI and TDDB," An IP.com Prior Art Database Disclosure, Aug. 10, 2010, 6 pages. IP.com No. IPCOM000198592D.

(Continued)

*Primary Examiner* — Dennis M Butler
(74) *Attorney, Agent, or Firm* — Penny Lowry; Robert Williams

(57) ABSTRACT

An electronic system is disclosed, which may include a phase pipeline, a data pipeline, an input phase selector, and an output phase selector. The phase pipeline may have latches clocked by a clock signal, and designed to propagate phase signals from a phase input to a phase output. The data pipeline may have latches clocked by the phase pipeline clock signal, and designed to propagate data from a data input to a data output. The input phase selector may be designed to provide an inverted or a non-inverted copy of data from a data input, in response to a value at the phase input, to the data pipeline data input. The output phase selector may be designed to provide an inverted or a non-inverted copy of data from the data pipeline output to an output phase selector data output, in response to a phase pipeline output value.

12 Claims, 6 Drawing Sheets

(56) References Cited

OTHER PUBLICATIONS

Bansal et al., "Impacts of NBTI and PBTI on SRAM static/dynamic noise margins and cell failure probability," Microelectronics Reliability 49 (2009), Apr. 2009, pp. 642-649, Copyright 2009 Elsevier Ltd. doi:10.1016/j.microrel.2009.03.016.

Chadwick, N., et al., "Determining Chip Burn-In Workload Using Emulated Application Condition," U.S. Appl. No. 14/027,594, filed Sep. 16, 2013.

* cited by examiner

300A
Phase Selector
Truth Table

| Phase Selector (XOR) Function | | |
|---|---|---|
| Data Input | Phase Input | Data Output |
| 0 | 0 | 0 |
| 1 | 0 | 1 |
| 0 | 1 | 1 |
| 1 | 1 | 0 |

300B
Exclusive-OR (XOR)
Phase Selector

300C
Exclusive-OR (XOR)
Phase Selector

300D
Multiplexer (MUX)
Phase Selector

CIRCUIT DESIGN FOR BALANCED LOGIC STRESS

TECHNICAL FIELD

The present disclosure relates to field-effect transistor (FET) circuits. In particular, this disclosure relates to balancing stress on field-effect transistors.

BACKGROUND

Digital circuits in electronic systems such as computer processors, handheld electronic devices and digital cameras may include N-channel field-effect transistors (NFETs), and P-channel field-effect transistors (PFETs) arranged in a complimentary fashion to perform logical functions. The threshold voltage ($V_T$) of a field-effect transistor (FET) is a characteristic that may be related to the electrical performance of circuits that include NFET and PFET devices. The threshold voltage of a FET device may change over time, as a result of transistor aging mechanisms, such as negative-bias temperature instability (NBTI), positive-bias temperature instability (PBTI) and hot-carrier injection.

A general trend of decreasing FET device geometries, such as gate length, may make smaller FETs increasingly vulnerable to aging mechanisms. Changes in FET threshold voltages resulting from aging mechanisms may result in decreased operating speed and/or drive strength of a digital circuit, such as a logic, repower, or memory circuit that includes NFETs and PFETs.

SUMMARY

Various embodiments of the present disclosure may be useful for reducing voltage threshold ($V_T$) variations of field-effect transistors (FETs) due to effects of bias temperature instability (BTI). An integrated circuit (IC) configured according to embodiments of the present disclosure may have reduced design guardband (margin) requirements, while having enhanced performance, resulting from the use of circuits that alternate the phase of data paths.

Embodiments may be directed towards an electronic system. The electronic system may include a phase pipeline, a data pipeline, an input phase selector, and an output phase selector. The phase pipeline may have a phase input, a phase output, and a plurality of series-connected latches. The series-connected latches may be designed to, in response to a clock signal, propagate phase signals from the phase input to the phase output. The data pipeline may have a data input, a data output, and a plurality of series-connected latches. The plurality of series-connected latches may be designed to, in response to the clock signal of the phase pipeline, propagate data from the data input to the data output. The input phase selector may be designed to provide data to the data input of the data pipeline. The input phase selector may, in response to a first value at the phase input, provide a non-inverted data from an input phase selector data input. The input phase selector may also, in response to a second value at the phase input, provide an inverted copy of data from an input phase selector data input. The output phase selector may be designed to provide to an output phase selector data output. The output phase selector may, in response to the first value at the phase output of the phase pipeline, provide a non-inverted data from the data output of the data pipeline. The output phase selector may also, in response to the second value at the phase output of the phase pipeline, provide an inverted copy of data from the data output of the data pipeline.

Embodiments may also be directed towards a method to control field effect transistor (FET) stress in a device. The method may include setting a phase signal to a first logical value for a first time interval, clocking, in response to a first clock transition and to the first logical value of the phase signal, both a non-inverted data into a data pipeline and the first logical value into a phase pipeline, and setting the phase signal to a second logical value for a second time interval. The method may also include clocking, in response to a second clock transition and to the second logical value of the phase signal, both an inverted copy of the data signal into the data pipeline and the second logical value into the phase pipeline, and clocking a data signal out of the data pipeline and a corresponding phase signal out of the phase pipeline. The method may also include outputting, in response to a first logical value of the corresponding phase signal, a first phase of the data signal from the data pipeline, and outputting, in response to a second logical value of the corresponding phase signal, a second phase of the data signal from the data pipeline.

Aspects of the various embodiments may be used to limit losses of FET drive strength over time. Aspects of the various embodiments may also be useful for providing cost-effective phase manipulation circuits for use with existing digital logic designs, by using existing and proven IC technologies and design methods.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
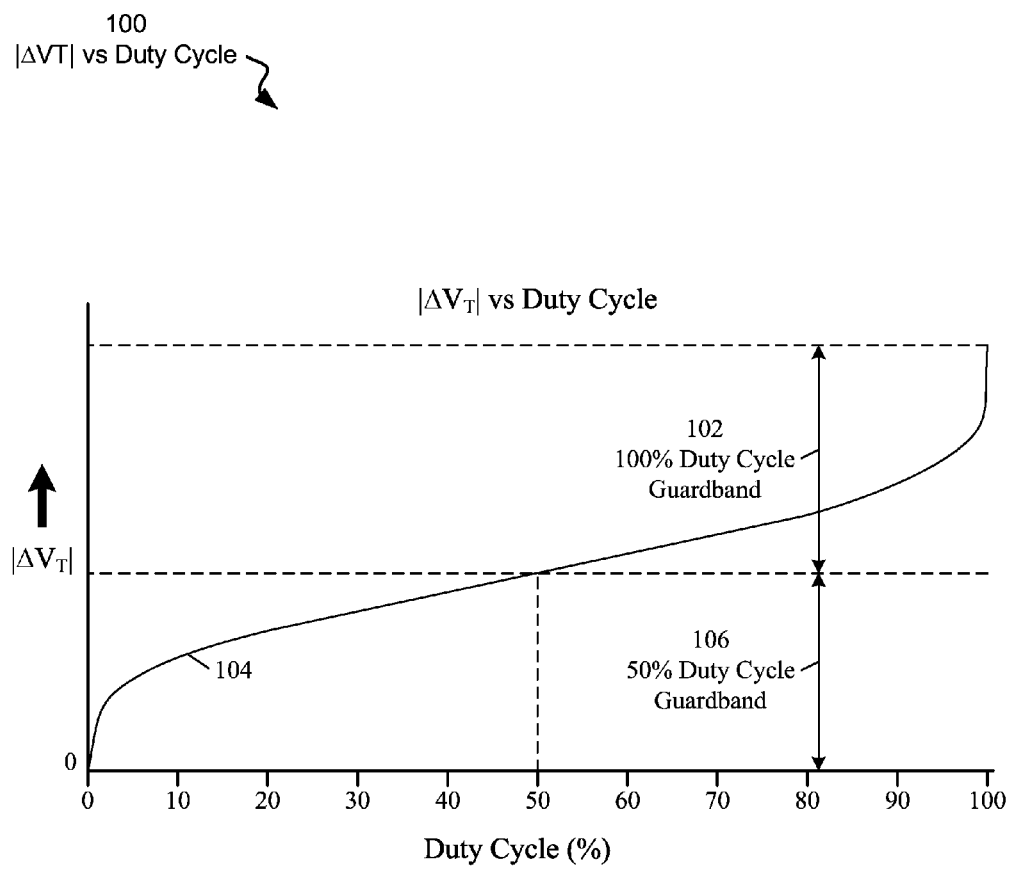
FIG. 1 is a graph of the absolute value of a change (Δ) in field-effect transistor (FET) threshold voltage ($V_T$) plotted against a range of FET duty cycles, according to embodiments of the present disclosure.

In the drawings and the Detailed Description, like numbers generally refer to like components, parts, steps, and processes. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Certain embodiments of the present disclosure can be appreciated in the context of a circuit used to alternate the phase of digital signals within synchronous data pipelines of an electronic device such as an integrated circuit (IC). Such signal types may include, but are not limited to, data and control signals. While not necessarily limited thereto, embodiments discussed in this context can facilitate an understanding of various aspects of the disclosure. Certain embodiments may also be directed towards other equipment and associated applications, selecting phases of signals propagated by digital signal pipelines in order to limit on-chip noise, to limit crosstalk, or to yield a specified level of signal pipeline performance. Such signal types may include, but are not limited to, data and control signals, and repowered versions of them.

Various embodiments of the present disclosure relate to circuits configured to control the amount of time that field-effect transistors (FETs) are operated under bias temperature instability (BTI) stress conditions by regularly alternating the phase of signals within a data pipeline, which can be useful for providing FETs with time to recover from BTI stress. This can be particularly useful for systems in which data pipelines may be placed into one state (e.g., with stress conditions) more than another state. Increased data pipeline performance may result from the use of phase changing circuits. The phase changing circuit may limit threshold voltage ($V_T$) shifts and resulting FET performance loss, and may be configured to be compatible with a variety of data and signal pipeline designs.

An IC designed according to certain embodiments may be compatible with existing and proven IC technologies and design techniques, and may be a useful and cost-effective way to limit delay skew between rising and falling edges of pipeline signals. An IC constructed according to embodiments of the present disclosure may have reduced noise and crosstalk between adjacent data pipelines, and as a result, may also have enhanced pipeline speed.

Digital circuits in electronic systems such as ICs may include n-channel field-effect transistors (NFETs) and P-channel field-effect transistors (PFETs) that are interconnected and used to perform logical and memory functions. A $V_T$ of FET is a device characteristic that may directly influence the electrical performance of circuits employing NFET and PFET devices. For example, a buffer circuit including FET devices with relatively low $V_T$ values may have a high current drive (sourcing or sinking) capability, and correspondingly, lower propagation delay than a circuit including FET devices with higher $V_T$ values.

The $V_T$ of a FET device may change over time, as a result of transistor aging mechanisms, such as negative-bias temperature instability (NBTI), positive-bias temperature instability (PBTI) and hot carrier injection (HCI). For example, cumulative NBTI effects on a PFET may double the absolute value of the PFET's $V_T$ from an initial value, over a period of several years. Similarly, cumulative PBTI effects on an NFET may significantly increase the absolute value of the NFET's $V_T$ from an initial value. For ease of discussion, BTI-related stress conditions are discussed in connection with a variety of embodiments; however, other stress conditions, such as HCI, may also be relevant to the various embodiments.

BTI may cause a gradual shift of threshold voltage over time in a FET. BTI may result from a voltage stress condition on the gate oxide of a FET, elevated operating temperature, and the amount of time (possibly expressed as duty cycle) that the stressing voltage is applied to the gate oxide. The $V_T$ shift may occur as a result of charge (either electrons or holes) being trapped in the FET gate oxide layer, or in a boundary between a silicon substrate and a gate oxide layer. The presence of trapped charge may have the effect of increasing (the absolute value of) the FET threshold voltage.

Advances in semiconductor technology have caused a reduction in the physical sizes of FETs. IC voltage supplies have been correspondingly reduced to accommodate the requirements of smaller sized FETs, and to conserve power. FET $V_T$s have also been reduced to mitigate the performance degradation effects of reduced FET gate voltages, resulting from supply voltage reduction. The effects of BTI may become more severe as a result of decreased transistor (FET) dimensions, increased electric fields applied to FET gate oxides, lower threshold voltages and lower operating voltages. Lower FET device operating voltages may cause a $V_T$ shift to have a proportionally larger effect on FET circuit behavior.

Changes in FET threshold voltages resulting from BTI may result in decreased operating speed and/or drive strength of a digital circuit that includes functions such as a logic, repower, or memory that make use of NFETs and PFETs. As a result of the shrinking sizes of the FETs and the corresponding voltage reductions, BTI-induced $V_T$ shifts in FETs have become a significant problem.

Negative bias temperature instability (NBTI) is a form of bias temperature instability particular to PFET devices, which may increase the absolute value of the PFETs $V_T$ (a relationship of the PFETs gate voltage relative to its source and drain voltages). NBTI-induced $V_T$ shift may accumulate in proportion to the time during which the PFET is in a voltage condition that stresses NBTI-induced $V_T$ shift.

A similar $V_T$ shift in NFETs exists, although generally to a lesser degree than in PFETs, in current technology. Such NFET $V_T$ shift is referred to as PBTI (positive bias temperature instability), which may increase the absolute value of the NFET's $V_T$ (a relationship of the NFET's gate voltage relative to its source and drain voltages). PBTI-induced $V_T$ shift may accumulate in proportion to the time during which the NFET is in a voltage condition that stresses PBTI-induced $V_T$ shift.

A voltage stress condition involves voltages being applied to a FET device, during which charge is trapped in the gate or in a silicon substrate/gate interface, which may result in a gradual FET $V_T$ shift. A PFET is in an NBTI voltage stress condition when the source and the drain of the PFET are both at a "high" voltage level and the gate is at a "low" voltage level. For example, in a complementary metal-oxide-semiconductor (CMOS) IC having a 1 volt (V) supply voltage, a PFET is in an NBTI voltage stress condition when its source and its drain are both at 1V and its gate is at ground (0V).

A voltage recovery condition involves voltages being applied to a FET device, during which trapped charge is released from a silicon-gate interface or from the gate, which may result in a reversal of the $V_T$ shift (caused by a voltage stress condition) in the FET over a period of time. Following the previous example, when the PFET gate is "high" and the source is "high", the PFET is in a recovery condition, and may partially recover from NBTI-induced $V_T$ degradation.

Similarly, an NFET is in a PBTI voltage stress condition when a gate of the NFET is "high" and a source and a drain of the NFET are at a "low" voltage, and is in a recovery condition when the gate and the source of the NFET are in a "low" state.

A duty cycle of a particular FET, signal, or signal path subject to BTI may be understood to be the ratio of time that the FET (or signal or path) spends in a voltage stress condition relative to its total operating time. For example, if a FET was held in a voltage stress condition for 4 seconds, and operated for 10 seconds, it would have a duty cycle of 40%.

A balanced duty cycle for PFETs (50% in an NBTI voltage stress condition, 50% in a recovery condition, or where the time intervals in each condition are substantially equal) may produce relatively uniform stress and allow significant time for the FET to recover from prior stress conditions. Alternating stress and recovery conditions may be a useful technique to mitigate and limit $V_T$ shift due to BTI.

Threshold voltage shifts resulting from BTI may occur over an extended period of time, possibly several years. BTI effects may result in FET performance degradation, increased sensitivity to supply voltages, and failure of circuits resulting from the performance degradation. BTI-related failures may be difficult to detect with existing test technology, and may be accompanied by catastrophic results.

For example, the delay of a particular logic path may be designed to be 900 ps, and the logic path may fail to meet timing requirements at 1100 ps. Over time, as FET $V_T$ values increase, the delay of the logic path may increase, eventually causing an IC failure when it exceeds 1100 ps. The logic path may have initially tested "good" by a chip tester, and may not have been problematic for a period of several years. The logic path may be deeply buried in the IC, and in-situ testing may not be available to identify the failure. The chip and/or functional unit containing the chip (e.g., a motherboard or backplane) may fail and need to be replaced A number of use situations can cause the duty cycle of a particular FET, signal, or signal path to be significantly different than 50%, and exacerbate the effects of BTI. For example, in logic function within an IC, logic built-in self-test (LBIST) is commonly applied during testing of the chip. LBIST is further used during burn-in stress conditions (elevated temperature and/or supply voltage) which are required to identify defects in the chip. Increased temperature and supply voltage conditions applied during burn-in may increase the rate of degradation due to BTI-induced $V_T$ shifts.

During burn-in, LBIST may produce patterns that are coupled to the functional logic. LBIST may check the resultant output patterns against results expected from a functional logic having no defects. The patterns may be designed to exercise the functional logic, stressing all possible defect types with various patterns. These patterns may not produce or guarantee a 50% duty cycle on each net, or FET in the logic. Some sets of LBIST patterns may actually result in a duty cycle approaching 100% for some FETs in the functional logic. Many electronic systems also run LBIST during restarts of the electronic systems. Restarts on many electronic systems can be induced by manual intervention.

During normal operation of an electronic system, some control or data signals may be set to a particular logic value, and rarely changed, causing some of the FETs to remain almost constantly in a BTI stress voltage condition, causing BTI-induced $V_T$ shift to accumulate. One example of a circuit having inputs that rarely change, is an address collision detection logic unit. In a computer, address collisions may occur very rarely, and thus the input signals to an address collision detection logic unit may change very infrequently. Another type of logic unit having rarely changing inputs may be an out-of-order execution determination unit. Holding FETs in such units in a nearly constant stress condition may cause them to accumulate $V_T$ shift, and correspondingly degrade their performance. Additional design margin may be required to counteract the performance degradation.

A possible strategy to mitigate the effects of BTI may include sizing transistor dimensions and adjusting corresponding electrical parameters to minimize the effects of BTI. However this may not be practical for high-density circuits such as microprocessors, where transistor density is critical to the IC's function and performance.

Additional design margin (guardband) may be added in order to compensate for expected long-term performance loss (resulting from a BTI-induced $V_T$ shifts), relative to the initial (expected) performance of a device or system. Adding additional design margin may result in lower overall system performance.

Other methods that attempt to address the performance degradation problem associated with BTI-induced $V_T$ shift may involve semiconductor process adjustments. However, techniques that may be used to mitigate $V_T$ shift, such as thinning gate oxides, or other dielectric material used for the gate dielectric, and decreasing supply voltages may cause the NBTI-induced $V_T$ shifts to be a more significant overall percentage of the normal $V_T$ variability.

BTI-induced $V_T$ shift in FETs (NFETs and PFETs) are herein discussed in detail. The examples described illustrate how embodiments of the present invention may overcome many of the adverse effects of BTI-induced $V_T$ shifts in both NFETs and PFETs. It is understood, however, that various embodiments are not necessarily limited to problems with BTI-induced $V_T$ shifts and can be used in connection with other considerations (e.g., HCI).

Certain embodiments relate to limiting BTI-induced $V_T$ shift of FETs within an IC. FIG. 1 is a graph $|\Delta V_T|$ vs. Duty Cycle 100 of the absolute value of a change in FET $V_T$ plotted against a range of FET duty cycles, according to embodiments of the present disclosure. Graph 100 may be useful for understanding a causal relationship between the duty cycle of a FET device subject to BTI and a change in $V_T$ resulting from operating the FET for an extended time period at the duty cycle.

A duty cycle of a particular FET, signal, or signal path subject to BTI may be understood as the ratio of time that the FET (or signal or path) spends in a voltage stress condition relative to its total operating time. The X-axis of graph 100 depicts a FET duty cycle range from 0% to 100%, where 0% duty cycle corresponds to the FET never being operated in a BTI stress condition, and 100% corresponds to the FET being operated continually in a BTI stress condition. The Y-axis of graph 100 depicts an absolute value of a change in FET threshold voltage ($|\Delta V_T|$), relative to an initial $V_T$ value (at duty cycle equals 0%), resulting from operation of the FET over a range of duty cycles. A change in an NFET threshold voltage ($\Delta V_T$) resulting from an increasing duty cycle may be increasing (positive), while similar changes in a PFET threshold voltage may be increasing (negative).

Curve 104 depicts the relationship between $|\Delta V_T|$ and duty cycle, and may generally illustrate and represent empirical (measured) NBTI or PBTI data. A portion of curve 104 corresponding to a duty cycle of less than approximately 10% illustrates a relatively rapid rise in $|\Delta V_T|$ with respect to duty cycle, while the portion of curve 104 corresponding to a duty cycle between approximately 10% and 90% illustrates a relatively linear rise in $|\Delta V_T|$ with respect to duty cycle. If the duty cycle is close to 0% (i.e., the FET is almost never in a BTI voltage stress condition), virtually no BTI-induced $V_T$ shift occurs. The portion of curve 104 corresponding to a duty cycle of greater than approximately 90% illustrates a relatively rapid rise in |$\Delta V_T$| with respect to an increase in duty cycle.

Guardband 106 corresponds to a change in $V_T$ of a FET resulting from operating the FET over an extended time period at a 50% duty cycle, with the $V_T$ at a duty cycle of 0% being an initial $V_T$ for the FET, before the FET is operated. Guardband 106 depicts a change of $V_T$ (which may correspond to a change of FET performance) that may be included in the initial design characterization, in order for the design to perform over an extended time period.

Similarly, guardband 102 represents an additional $V_T$ margin required in order to ensure that a design may operate up to 100% duty cycle over an extended time. Including additional design margins (guardbands) to accommodate long-term changes in $V_T$ may require that a design including FETs be specified to have significantly compromised initial level of performance. As an example, a supply voltage for a CMOS chip may be approximately 1V and an initial PFET $V_T$ (duty cycle equals 0%) may be approximately 200 mV. An NBTI-induced $V_T$ shift of 80 to 90 mV may be a significant percentage of the total $V_T$ of current PFETs, and may result in a corresponding loss of circuit performance.

Overall, graph 100 may serve to illustrate a benefit of limiting FET duty cycles to 50%, in order to eliminate the need for an additional guardband (102), and corresponding increased design margin. Limiting FET duty cycles to 50% (allowing NFETs and PFETs to each have time at their respective recovery conditions) may allow designs to accumulate the lowest sum of (NBTI+PBTI) induced $V_T$ shift over time. In certain circuits, particularly ones that have propagation delay and possible $V_T$ degradation characteristics dominated by a particular type of device (NFET or PFET) process skew set, parameter set, or design, a lower or higher duty cycle, e.g., 10%, 20%, 60%, or 80% may be acceptable, and suitable for limiting the overall $V_T$ shift over time.

Figure 2:
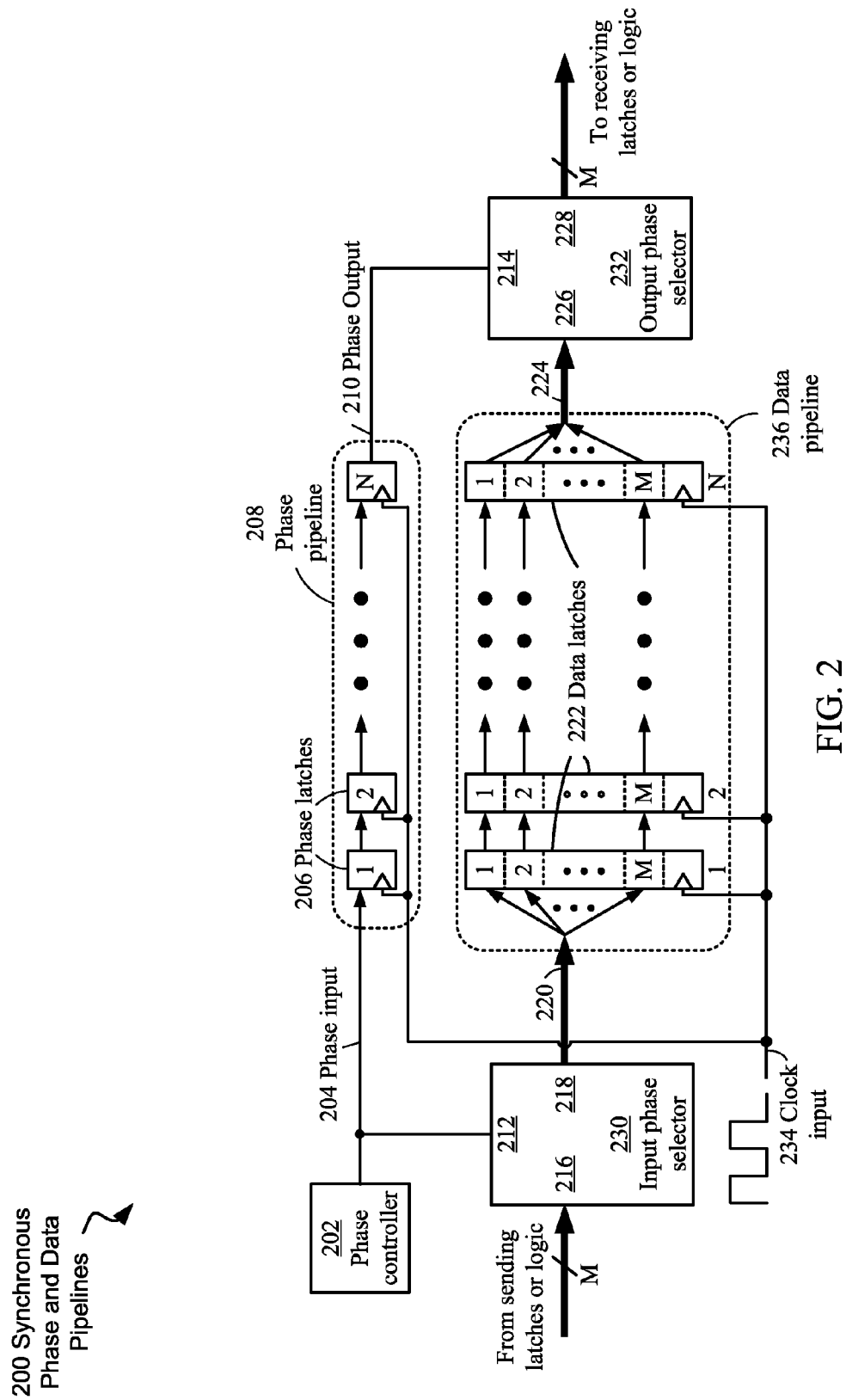
FIG. 2 is a block diagram representation of synchronous phase and data pipelines including a phase controller, input phase selector and output phase selector, according to embodiments.

FIG. 2 is a block diagram representation of synchronous phase and data pipelines (208 and 236, respectively) including a phase controller 202, input phase selector 230 and output phase selector 232, according to embodiments. The circuit depicted in FIG. 2 may be included in an electronic system such as an IC, computer system, or other electronic device. Synchronous phase and data pipelines (208, 236), in conjunction with the phase controller 202 and phase selectors 230, 232 may generally be used as a circuit to control (or limit) the amount of time that the digital data propagating through the data pipeline 236 remains in a particular logic state, corresponding to a BTI stress condition for FETs within the pipeline, according to embodiments. Limiting BTI stress conditions for data pipeline FETs may be particularly useful in limiting a shift in threshold voltage ($\Delta V_T$) for the FETs, and limiting corresponding pipeline circuit performance degradation.

The phase controller 202 is a circuit that may be designed to provide a phase signal on a phase input 204 of the phase pipeline 208 and to the phase input 212 of the input phase selector 230. The phase signal may be a logical value ("0" or "1"), and the phase controller 202 may be designed to change the phase signal at a regular time interval. For example, the phase controller 202 may output a "0" for a specified time period (e.g. 500 ms), followed by a "1" for 500 ms, in a repeating, alternating pattern.

The phase controller 202 may be designed to provide a phase signal having a duty cycle of approximately 50%, according to certain embodiments. The phase controller 202 may be designed to provide a phase signal with a duty cycle substantially different than 50%, for example, in the range between 20% and 80%, according to certain embodiments. The phase controller 202 may be designed to output a phase signal with a particular duty cycle corresponding to particular circuit topologies of data pipeline 236. For example, if data patterns and the characteristics of a circuit strongly favor a particular logic state (e.g., logical "0") for a certain FET within the circuit, and a "non-inverted" phase of data input to the circuit would cause a logical "1" to be present, then the duty cycle of the phase controller may be adjusted to a value different than 50%, for example, 30%. Similarly, the duty cycle may be adjusted to compensate for elements within a circuit that dominate the delay, for example a driver or inverter with strong (large) PFET devices. Alternating the data phase on a circuit periodically may make balanced BTI stress and recovery times possible, without altering the function of the circuit itself.

Input phase selector 230 may be useful for selecting a particular phase of data to input to data pipeline 236, in response to the phase signal from phase controller 202, received at phase input 212. Input phase selector 230 may receive one or ("M") data bits on data input 216 from one or more latches or a section of logic within the electronic system. The number "M" may be any number of bits that are useful within the electronic system. For example, "M" may be 32, 64, or 128 bits, corresponding to the width of a data bus, or "M" may be 4 bits or 8 bits, corresponding to a group of control signals. Input phase selector 230 may output the "true" or "complement" phase of the "M" data bits received at data input 216 on data output 218, in response to the value of the phase signal received at input 212. Output 218 may be coupled to data input 220 of data pipeline 236.

The data pipeline 236 may include one or more ("N") series-connected data latches 222, with each of the "N" data latches 222 having "M" bits. Each set of "N" series-connected data latches 222 may be coupled to, and clocked by, a clock input 234, and may allow "M" bits of data to propagate synchronously through the pipeline 236 from the input 220 to the output 224. Data bits may advance to the next latch in response to each subsequent clock cycle received on clock input 234. The "N" series-connected data latches 222 may be latches, flip-flops, or other types of clocked data storage elements. Data pipelines in certain embodiments may include a relatively small number of data paths, and may be used sparingly throughout an IC. Data pipelines in certain embodiments may include a relatively large number of data paths, and may be used extensively throughout an IC, or section of an IC.

Data pipeline 236 may be useful as a synchronous staging device within the electronic system, and may be particularly useful for controlling the flow and propagation of data, control, or repowered signals. In an embodiment, the "N" data latches 222 may be distributed across the area of an integrated circuit, and used to ensure timely, synchronous propagation of data, control or repowered signals between remote locations, possibly separated by wires having a propagation delay of several clock cycles. The clock input 234 may be used to synchronously clock both data pipeline 236 and phase pipeline 208.

The phase pipeline 208 may include a one or ("N") series-connected phase latches 206, with each of the "N" latches containing a single phase bit. Each set of "N" series-connected phase latches 206 may be coupled to, and clocked by, a clock input 234, and may allow phase bits to propagate synchronously through the pipeline 208 from the phase input 204 to the phase output 210. Phase bits may advance to the next phase latch 206 in the phase pipeline 208, in response to each subsequent clock cycle on clock input 234. Phase pipeline 208 may be particularly useful for containing phase bits corresponding to data, control, or repowered signals contained in the "N" data latches 222.

In an embodiment, the "N" phase latches 206 may be distributed across the area of an integrated circuit, corresponding to data latches 222, and used to ensure timely, synchronous propagation of phase signals between remote locations, possibly separated by wires having a propagation delay of several clock cycles.

The timing of the phase signal on phase input 204 and the corresponding "M" bits of data from output 218 of input phase selector 230 may be designed to allow the phase signal and the corresponding data to progress through pipelines 208, 236, respectively, in a synchronous, lockstep fashion, and appear simultaneously at outputs 210 and 224 in response to a series of "N" clock signals.

Output phase selector 232 may be useful for selecting and outputting a particular phase of data received from data pipeline 236, in response to the phase signal from phase output 210 of phase pipeline 208. Output phase selector 232 may receive "M" bits of data on input 226 from data output 224 of data pipeline 236, and may output the "true" or "complement" phase of the "M" data bits received onto output 228, in response to the value of the phase signal received at input 214. Output 228 may be coupled to a receiving set of latches or a block of logic within the electronic system. The logical function and implementation of output phase selector 232 may be similar to that of input phase selector 230.

The circuit depicted in FIG. 2 may be useful for altering the phase of the data, using input phase selector 230, before the data enters data pipeline 236, synchronously propagating "M" bits of data through data pipeline 236, and subsequently reversing the phase alteration of the data after it exits data pipeline 236, using output phase selector 232. These operations may ensure that the data received by input phase selector 230 and the data output by output phase selector 232 maintains an identical polarity, while changing the phase of data within the data pipeline 236. Changing the phase of data within a data pipeline 236 may be useful in altering the duty cycle of particular data bits (and corresponding data pipeline 236 FET devices), which may result in a reduction of BTI effects and $V_T$ shift on the FET devices, which may control delay degradation resulting from $V_T$ shift. Reducing FET $V_T$ shift may result in reduced design margin (guardbanding) design requirements on, and increased performance of the data pipeline 236 of the electronic system.

Figure 3:
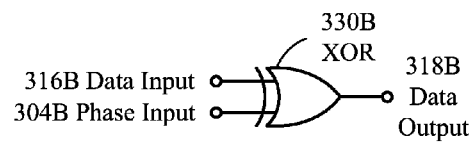
FIG. 3 includes a phase selector truth table, and 3 schematic views of phase selector circuits, according to embodiments.
Figure 3:
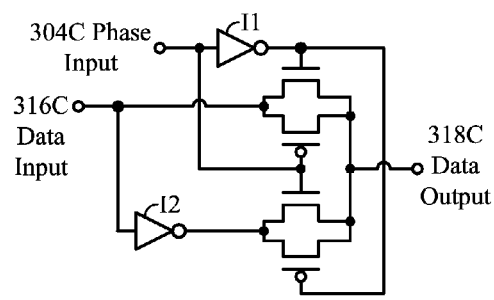
Figure 3:
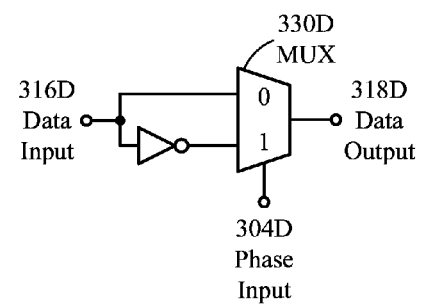

FIG. 3 includes a phase selector truth table, and schematic views of 3 phase selector circuits, according to embodiments. Phase selector truth table 300A illustrates logical relationships between inputs and outputs of a single bit of a phase selector such as 230, 232 (FIG. 2). The logical relationships illustrated may apply to phase selector circuits 300B, 300C and 300D. The logical relationships of the truth table apply independently to each bit of phase selector embodiments that include multiple bits. The logical function of the phase selector is to pass a non-inverted copy of a data input to the data output in response to a "0" phase input, and to pass an inverted copy of the data input to the data output in response to a "1" phase input.

Phase selector 300B is an exclusive-OR (XOR) gate 330B consistent with XOR gates used within logical functions of digital ICs, and includes a data input 316B, a phase input 304B, and data output 318B.

Phase selector 300C is an exclusive-OR (XOR) gate consistent with XOR gates used within logical functions of digital ICs, and includes a data input 316C, a phase input 304C, and data output 318C. The circuit topology illustrated, including inverter I1 and I2 may have a certain performance (propagation delay) advantages over other implementations of XOR gates.

Phase selector 300D is a multiplexer (MUX) implementation consistent with multiplexers used within logical functions of digital ICs, and includes a data input 316D, a phase input 304D, and data output 318D.

Each of the phase selector implementations illustrated in 300B, 300C, 300D may perform a similar phase selection function, and may be useful in transferring either an inverted or a non-inverted copy of a data input to a data output of the selector, in response to a phase input. Each of the implementations 300B, 300C, 300D may be used as either an input phase selector or an output phase selector (e.g., 230, 232 respectively, FIG. 2).

Figure 4:
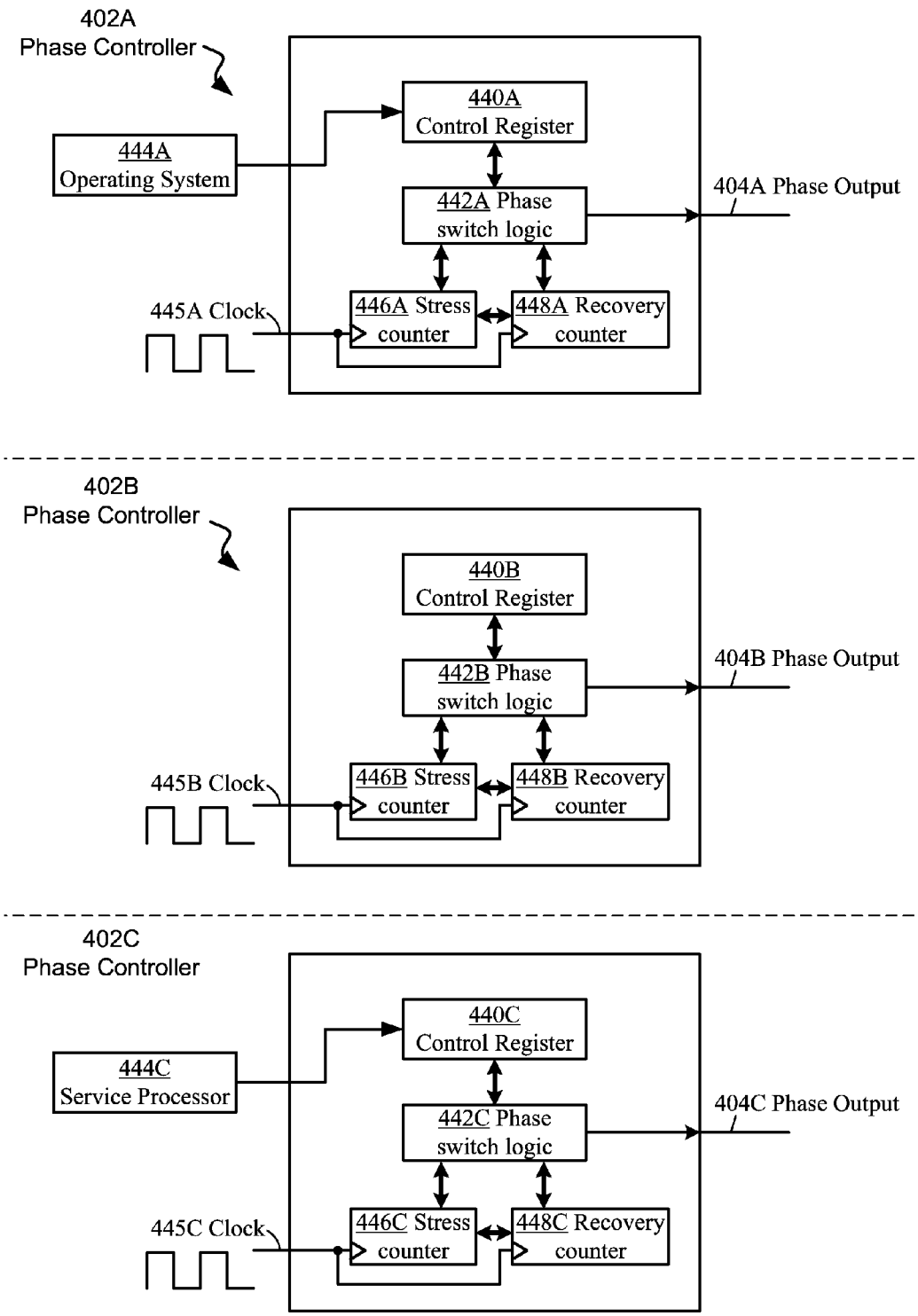
FIG. 4 includes 3 block diagrams of phase controller circuits, according to embodiments.

FIG. 4 includes 3 block diagrams 402A, 402B, 402C illustrating phase controller circuits, according to embodiments generally consistent with phase controller 202 (FIG. 2). Phase controller 402A includes control register 440A, phase switch logic 442A, stress counter 446A, and recovery counter 448A, and may be generally useful for regularly alternating a logical signal value on phase output 404A, which may be used to control an input phase selector (e.g. 230, FIG. 2) and as an input to a phase pipeline (e.g. 208, FIG. 2).

Control register 440A may be designed to receive count values from a control module (e.g., firmware, an operating system or a software driver) 444A and subsequently load them into stress counter 446A and recovery counter 448A. The count values may be used to determine the duration of a time interval that phase output 404A spends in each of a BTI stress state and a BTI recovery state. Control register 440A may be designed to hold default count values, which may be used in the absence of receiving count values from operating system 444A. The count values may be used to determine both the duty cycle of the phase signal on phase output 404A, and the frequency or period of the phase signal. A duty cycle of the phase signal may set to approximately 50% (substantially equal time intervals in each of a BTI stress state and a BTI recovery state), or may be set to values other than 50%, for example, in the range of 20% to 80%, according to phase characteristics of the data pipeline.

Generally the effects of BTI (both NBTI and PBTI) on the FETs within an IC may accumulate over an extended period of time (years). Correspondingly, the count values used to determine time intervals for FETs to be in stress and recovery conditions may be very large. For example, in certain embodiments a count value may be 10,000 clock cycles, and certain embodiments a count value may be 1,000,000 clock cycles or more. A large count value can result in fewer switching of transistor states due to changes in the phase signal, which can reduce associated power consumption.

The operating system 444A may load programmable control register 440A with values using interfaces such as on-chip scan path, or memory-mapped input/output (MMIO). Default values may also be designed into control register 440A, or programmed into devices such as e-fuses, or non-volatile memory, and read from those devices into control register 440A.

Phase switch logic 442A may be designed to act as an interface by transferring the stress and recovery period values from control register 444A to stress counter 446A and recovery counter 448A. Phase switch logic 442A may also enable and disable counters 446A and 448A at the beginning and end of their respective counts, and produce a phase signal on phase output 404A corresponding to the count value used in each counter. Stress counter 446A and recovery counter 448A may be clocked by a clock signal received on clock input 445A. Phase switch logic 442A may be designed to ensure that the phase signal on phase output 404A is properly synchronized with the clock signal received on clock input 445A.

Phase controller 402B is generally consistent with phase controller 402A, having similar functions including control register 440B, phase switch logic 442B, stress counter 446B, recovery counter 448B and phase output 404B. Similar to phase controller 402A, counters 446B and 448B are clocked by clock 445B. Default count values may be designed into control register 440B, or programmed in using devices such as e-fuses, or non-volatile memory.

Phase controller 402C is generally consistent with phase controller 402A, having similar functions including control register 440C, phase switch logic 442C, stress counter 446C, recovery counter 448C and phase output 404C. Similar to phase controller 402A, counters 446C and 448C are clocked by clock 445C. Default count values may be loaded into control register 440C through a service processor 444C, which may be a control unit that performs service and maintenance functions on an electronic system, such as a computer. Default count values may also be loaded in using devices such as e-fuses, or non-volatile memory.

Figure 5:
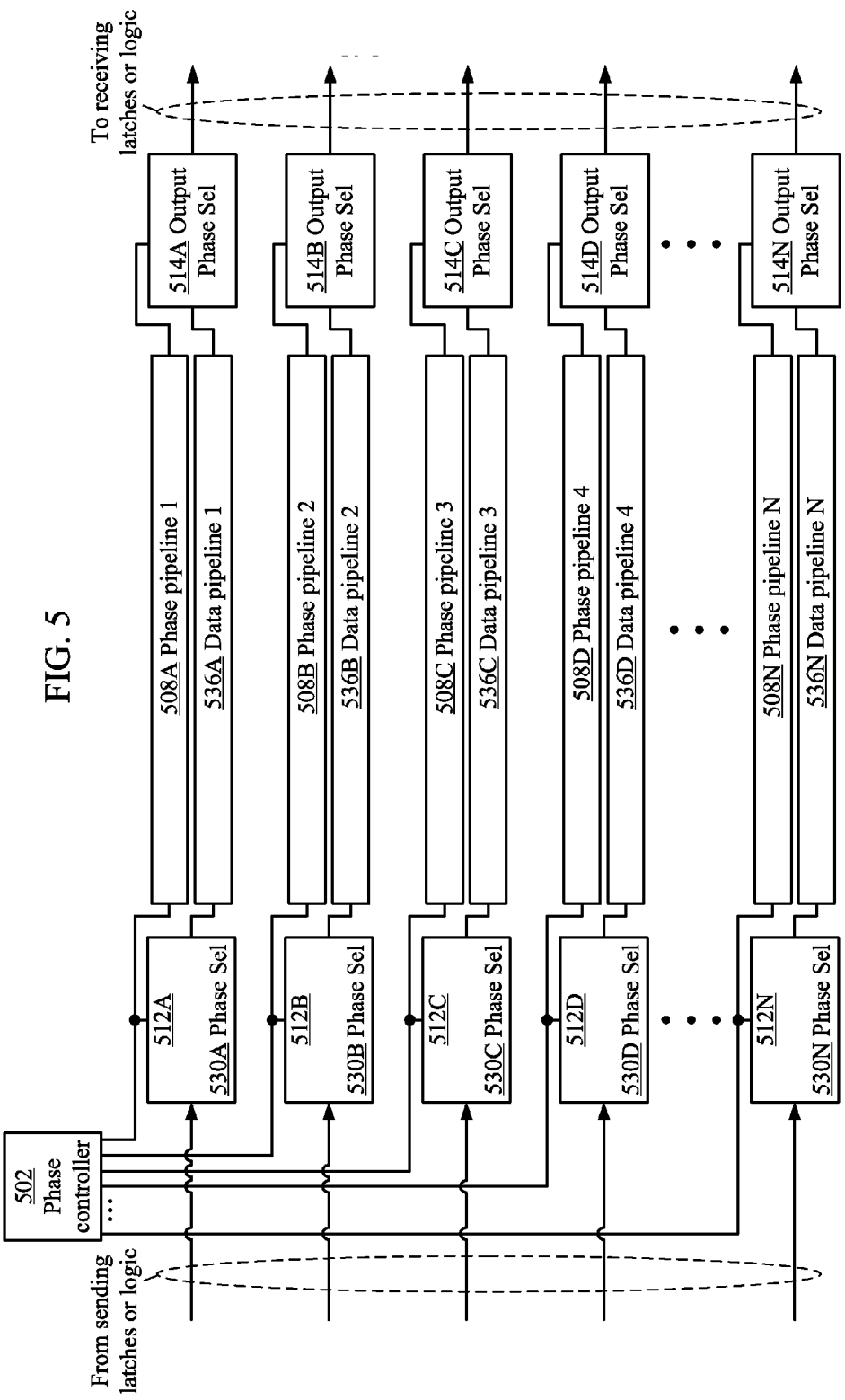
FIG. 5 is a block diagram representation of physically adjacent phase and data pipelines, including a phase controller, input phase selectors and output phase selectors, according to embodiments.

FIG. 5 is a block diagram representation of physically adjacent phase and data pipelines 508A . . . 508N and 536A . . . 536N, respectively, including a phase controller 502, input phase selectors 530A . . . 530N and output phase selectors 514A . . . 514N, according to embodiments generally consistent with FIG. 2. FIG. 5 depicts a plurality of data pipelines that are arranged as physically adjacent to each other, for example, data pipeline 1 536A is adjacent to data pipeline 2 536B, which is adjacent to data pipeline 3 536C.

Phase controller 502 may be designed to output unique phase input signals (on inputs 512A . . . 512N) to each of the input phase selectors 530A . . . 530N, which may be useful in reducing electrical noise and crosstalk between adjacent data pipelines. For example, if the data flowing through data pipeline 1 536A has data patterns that cause electrical interference with data pipeline 2 536B, changing the phase of either data pipeline 536A or 536B may be useful in reducing the electrical interference between them.

Outputting unique phase input signals may also be useful in reducing IC power supply noise, and selection of a logic phase for each data pipeline that yields greater performance than another logic phase. For example, if two adjacent data pipelines frequently have data transitions in the same direction in a similar time interval (e.g., from a logical "1" to a logical "0", on the same clock signal transition), this may cause excessive local ground bounce on an IC's power supply structure. Alternating the phase of one of these adjacent pipelines may be useful in reducing local ground bounce. A particular data pipeline may have unbalanced delay characteristics, causing it to propagate data faster using one particular phase of the data. Individual, unique phase control signals from phase controller 502 (per data pipeline) may be useful in selecting the fastest phase of data propagation on a per-pipeline basis.

Phase pipelines may include a number of distribution structures such as clock H-trees, grids, and other clock tree structures. Data pipelines depicted in FIG. 5 may be synchronous, as depicted in FIG. 2.

Figure 6:
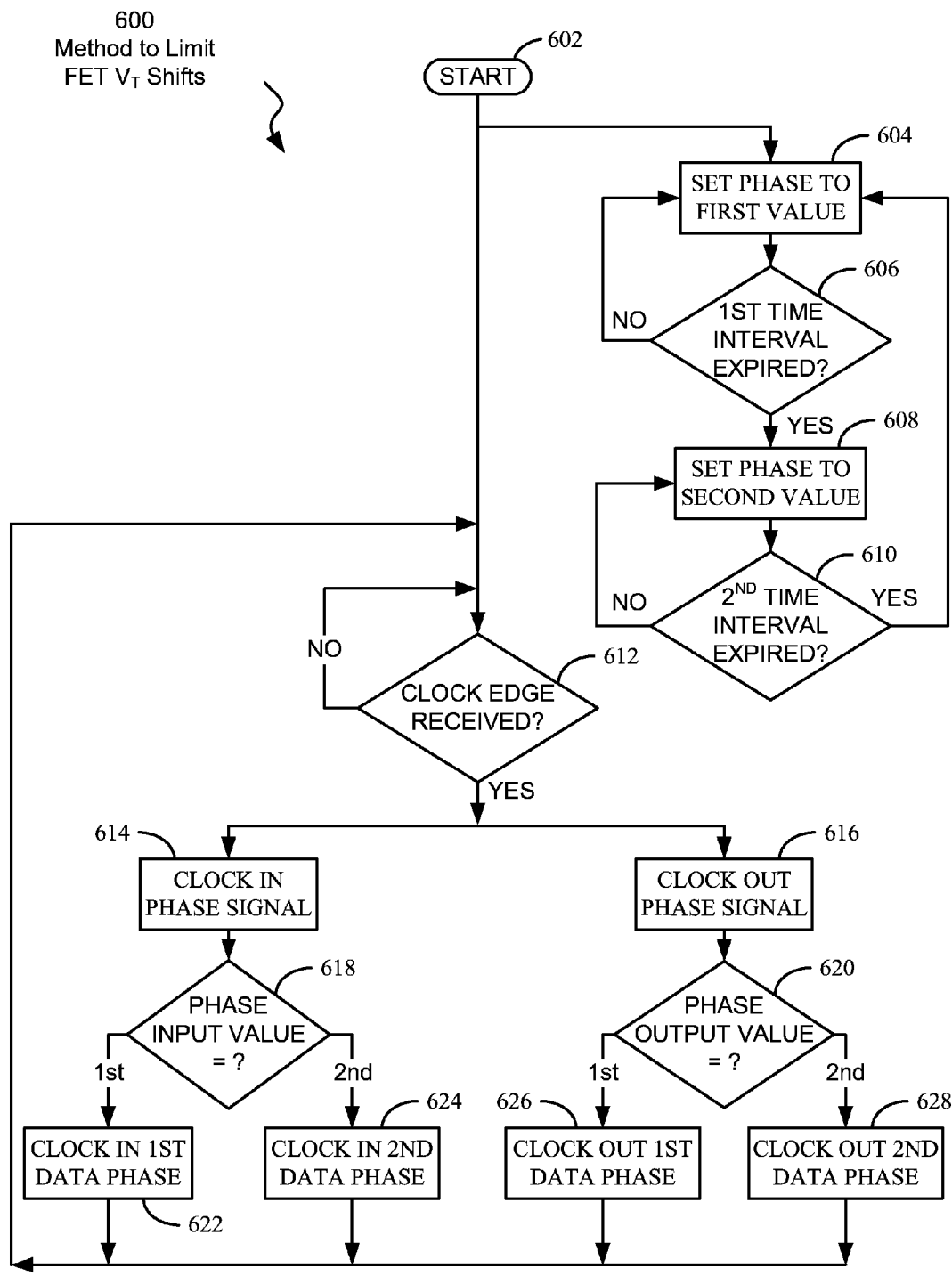
FIG. 6 is a flow diagram illustrating a method to limit bias temperature instability in a FET used in an electronic circuit, according to embodiments.

FIG. 6 is a flow diagram illustrating a method to limit $V_T$ shifts in a field-effect transistor (FET) used in an electronic circuit, according to embodiments. $V_T$ shifts in FET transistors may result from BTI, hot-carrier injection (HCI), or other causes. The operations illustrated in FIG. 6 may occur during a normal operation of an electronic system, or in conjunction with the execution of a set of LBIST patterns and/or a burn-in test of the electronic system. The process 600 moves from start 602 to operation 604 and to decision 612.

Operation 604 generally refers to setting a phase signal to a first logical value ("0" or "1"). The phase signal may be set by a phase controller, as depicted, for example, by 202 (FIG. 2), and 402A, 402B, 402C (FIG. 4). The phase signal may be received at a phase input of a phase pipeline such as 208 (FIG. 2), and at a phase input of an input phase selector such as 230, (FIG. 2). Once the phase signal is set to a first logical value, the process moves to decision 606.

At decision 606, a first time interval corresponding to the amount of time that the phase signal has been set to the first logical value is evaluated against a first predetermined first time interval. The length of the first predetermined time interval may be contained in the control register of a phase controller, such as 440A (FIG. 4), and the elapsed time of the first time interval may be contained in a counter, such as 446A or 448A (FIG. 4). The first time interval may be represented as a number of clock cycles received at a clock input such as 445A, (FIG. 4). If the first time interval has expired (equaled the first predetermined time interval) then the process moves to operation 608. If first time interval has not expired (is less than the first predetermined first time interval), then the process returns to operation 604.

Operation 608 generally refers to setting a phase signal to a second logical value (the complement of the first logical value). The phase signal may be set by a phase controller, and may be received at a phase input of a phase pipeline, and at a phase input of an input phase selector. Once the phase signal is set to a second logical value, the process moves to decision 610.

At decision 610, a second time interval corresponding to the amount of time that the phase signal has been set to the second logical value is evaluated against a second predetermined second time interval. The second predetermined time interval may be contained in the control register of a phase controller and the elapsed time of the second time interval may be contained in a counter. The second time interval may be represented as a number of clock cycles of a clock such as 445A, (FIG. 4). If the second interval has expired (equaled the second predetermined time interval) then the process returns to operation 604. If second time interval has not expired (is less than the second predetermined time interval), then the process returns to operation 608. The sequence of process steps 604, 606, 608, 610 may continue to repeat (cycle) for as long as the electronic system is powered on.

At decision 612, a determination of whether a clock signal transition has been received or has not been received is made. The determination may be made by clocked phase latches in a phase pipeline (e.g. 208, FIG. 2) and by clocked data latches in a data pipeline (e.g. 236, FIG. 2). If a clock signal transition is received then the process moves to operations 614 and 616. If a clock signal transition has not been received, then the process remains at operation 612.

Operation 614 generally refers to clocking a phase signal into a phase pipeline (e.g., 208, FIG. 2). The phase signal may be set by a phase controller, and may alternate periodically, based on values programmed into the phase controller. Once the phase signal is clocked into a phase pipeline, the process moves to decision 618.

At decision 618, the phase input value is compared to a first phase value and a second phase value by an input phase selector such as 230 (FIG. 2). The first phase value may be a logical "0" or a logical "1", and the second phase value may be the complement of the first phase value. If the phase input value is equal to the first phase value, the process moves to operation 622. If the phase input value is equal to the second phase value, the process moves to operation 624.

Operation 622 generally refers to clocking a first phase of data received by an input phase selector such as 230 (FIG. 2) into the data input of a data pipeline such as 236 (FIG. 2). The first phase of data may correspond to the value of the phase signal clocked into the input phase selector in operation 614. For example, the phase signal of operation 614 may be a logical "0", and the first phase of data may be a non-inverted copy of the data received by the input phase selector. The clocking of data in operation 622 may occur in response to the clock signal transition of operation 614, used to clock in a phase signal corresponding to the data. Once a first phase of data is clocked into the data pipeline, the process returns to decision 612.

Operation 624 generally refers to clocking a second phase of data received by an input phase selector such as 230 (FIG. 2) into the data input of a data pipeline such as 236 (FIG. 2). The second phase of data may correspond to the value of the phase signal clocked into the input phase selector in operation 614. For example, the phase signal of operation 614 may be a logical "1", and the second phase of data may be an inverted copy of the data received by the input phase selector. The clocking of data in operation 624 may occur in response to the clock signal transition of operation 614, used to clock in a phase signal corresponding to the data. Once a second phase of data is clocked into the data pipeline, the process returns to decision 612.

Operation 616 generally refers to clocking a phase signal out of a phase pipeline (e.g., 208, FIG. 2). The phase signal may have been clocked into the phase pipeline "N" clock cycles previously, where "N" represents the depth (number of stages) of the phase pipeline. Once the phase signal is clocked out of the phase pipeline, the process moves to decision 620.

At decision 620, the phase output value is compared to a first phase value and a second phase value by an output phase selector such as 232 (FIG. 2). The first phase value may be a logical "0" or a logical "1", and the second phase value may be the complement of the first phase value. If the phase output value is equal to the first phase value, the process moves to operation 626. If the phase input value is equal to the second phase value, the process moves to operation 628.

Operation 626 generally refers to clocking a first phase of data received by an output phase selector such as 232 (FIG. 2) onto the data output of the output phase selector, which may be coupled to receiving latches or logic within the electronic system. The first phase of data may correspond to the value of a corresponding phase signal clocked out of the phase pipeline in operation 616. For example, the phase signal of operation 616 may be a logical "0", and the first phase of data may be a non-inverted copy of the data received by the output phase selector. The clocking of data in operation 626 may occur in response to the clock signal transition of operation 616, used to clock out a phase signal corresponding to the data. Once a first phase of data is output onto the output phase selector output, the process returns to decision 612.

Operation 628 generally refers to clocking a second phase of data received by an output phase selector onto the data output of the output phase selector. The second phase of data may correspond to the value of a corresponding phase signal clocked out of the phase pipeline in operation 616. For example, the phase signal of operation 616 may be a logical "1", and the second phase of data may be an inverted copy of the data received by the output phase selector. The clocking of data in operation 626 may occur in response to the clock signal transition of operation 616, used to clock out a phase signal corresponding to the data. Once a second phase of data is output onto the output phase selector output, the process returns to decision 612.

Operations 626 and 628 may adjust the phase of the data output from the data pipeline to its original phase (at the data input of the input phase selector), before outputting it to receiving latches or logic. This phase adjustment may ensure that downstream (receiving) latches or logic may receive the correct phase, while possibly allowing FET devices within the data pipeline balanced amounts of time in both stress and recovery conditions, which may result in a reduction of BTI-induced $V_T$ shifts in the FETs, and reduced propagation delay degradation.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An electronic system comprising:
   a phase pipeline, having:
      a phase input;
      a phase output; and
      a plurality of series-connected latches designed to, in response to a clock signal, propagate phase signals from the phase input to the phase output;
   a data pipeline, having:
      a data input;
      a data output; and
      a plurality of series-connected latches designed to, in response to the clock signal of the phase pipeline, propagate data from the data input to the data output;
   an input phase selector, designed to provide to the data input of the data pipeline:
      in response to a first value at the phase input, non-inverted data from an input phase selector data input; and
      in response to a second value at the phase input, an inverted copy of data from an input phase selector data input; and
   an output phase selector, designed to provide to an output phase selector data output:
      in response to the first value at the phase output of the phase pipeline, non-inverted data from the data output of the data pipeline; and
      in response to the second value at the phase output of the phase pipeline, an inverted copy of data from the data output of the data pipeline.

2. The electronic system of claim 1, further comprising a phase controller designed to, in response to programmable frequency and duty cycle parameters, provide a phase signal that alternates between the first value and the second value to the phase input of the phase pipeline and to the input phase selector.

3. The electronic system of claim 2, wherein the phase controller is designed to periodically change a logical value of the phase signal.

4. The electronic system of claim 2, wherein the phase controller is designed to provide the phase signal with a duty cycle of approximately 50%.

5. The electronic system of claim 2, wherein the phase controller is designed to provide the phase signal with a duty cycle within a range of approximately 10% to 90%.

6. The electronic system of claim 2, wherein the phase controller is designed to, in response to parameters received from an operating system, change a duty cycle and a frequency of the phase signal.

7. The electronic system of claim 2, wherein the phase controller is designed to, in response to parameters received from a service processor within the electronic system, change a duty cycle and a frequency of the phase signal.

8. The electronic system of claim 1, wherein at least one of the input phase selector and the output phase selector includes an exclusive-OR (XOR) gate.

9. The electronic system of claim 1, wherein at least one of the input phase selector and the output phase selector includes a multiplexer (MUX).

10. The electronic system of claim 1, wherein the data pipeline has a data bus width greater than 1, and wherein each series-connected pipeline latch stage is clocked with a same clock signal of the phase pipeline.

11. The electronic system of claim 1, wherein the data pipeline is designed to propagate digital data.

12. The electronic system of claim 1, wherein the data pipeline is designed to propagate digital control signals.

* * * * *